Patented Aug. 29, 1933

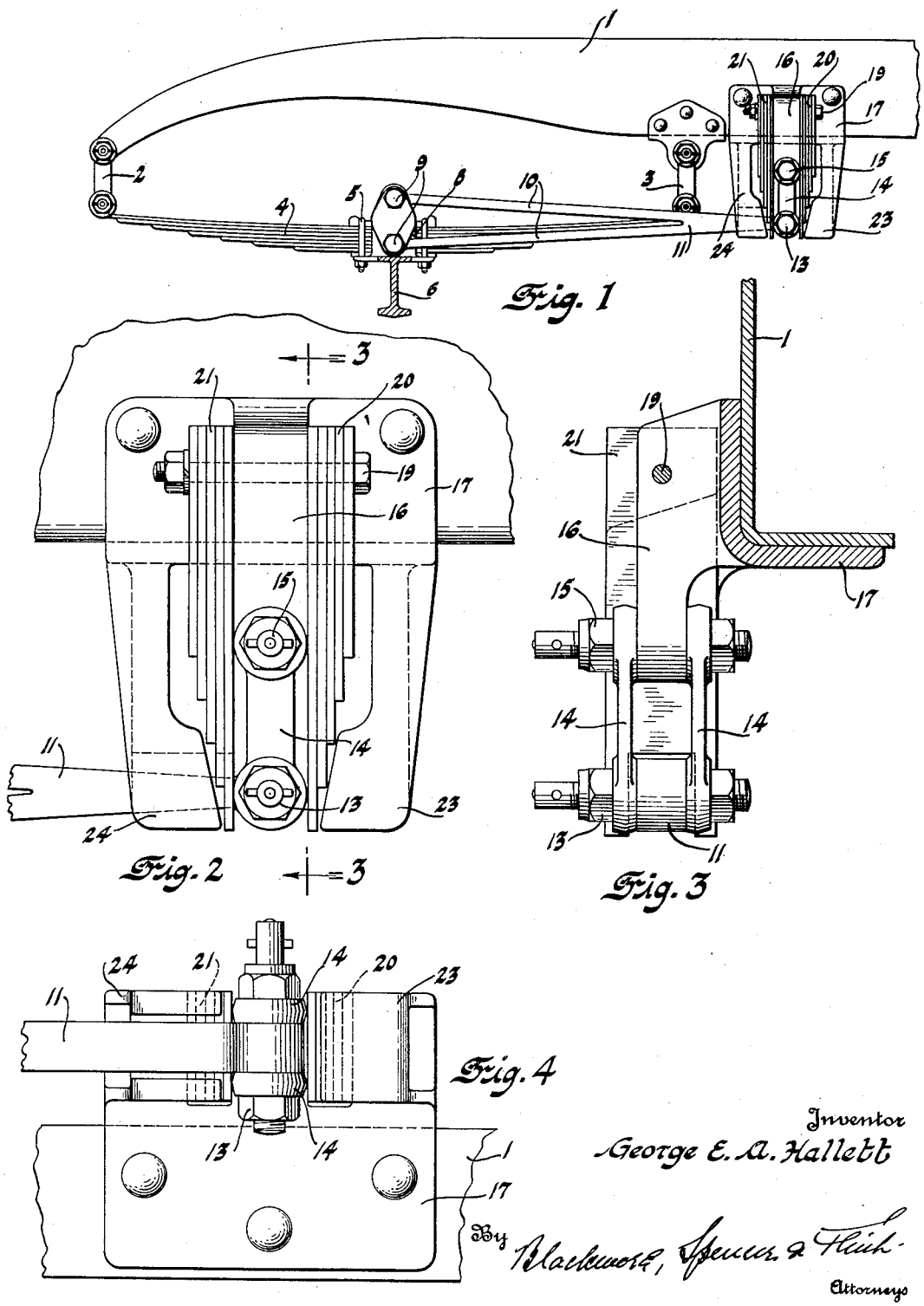

1,924,718

UNITED STATES PATENT OFFICE 1,924,718

ANTISHIMMY DEVICE

George E. A. Hallett, Detroit, Mich., assignor to General Motors Research Corporation, Detroit, Mich., a corporation of Delaware Application December 23, 1929
Serial No. 416,121

8 Claims. (Cl. 267—67)

This invention relates to motor vehicles and more particularly to the spring mounting of a vehicle frame upon an axle.

For many years past most motor car manufacturers have elected to flexibly support the front of the chassis frame upon the forward axle through a pair of spaced semi-elliptical multi-leaf springs extending longitudinally of the car, adjacent or beneath the side frame members, with one end of each spring pivoted to a fixed part of the frame for drive purposes and the opposite end connected with the frame through a swinging link or shackle to accommodate spring extension upon deflection. While this arrangement has been generally satisfactory, recent developments seem to indicate that the front wheel wobble and shimmy, particularly at high speeds, is of more or less common occurrence with the conventional spring mounting, and that this can be overcome if both ends of one or both springs are connected through swinging shackles or the like. However, the use of freely swinging shackles at both ends of the spring destroys the drive connection through the spring and attempts have heretofore been made to retain the thrust transmitting characteristics by the provision of a special connection embodying loaded springs, whereby the parts under normal conditions are firmly held but are permitted to move under forces incident to wheel wobble.

As distinguished from this last mentioned expedient, it is proposed according to present invention to entirely eliminate the transmission of driving thrust through the load supporting springs and to use instead a front axle torque arm with at least one of the load supporting springs connected to the frame in a manner that both ends are free to move in response to its extensions, the torque arm being arranged to allow a limited fore and aft movement of the front axle against spring resistance, to cushion and prevent the inception of wheel fight and absorb the violent shock that would otherwise be felt in the steering gear.

The invention will be better understood by reference to the accompanying drawing, illustrating a preferred, but not necessarily the only embodiment, and wherein Figure 1 is a side elevation of a front portion of a chassis frame supported upon an axle in accordance with the invention; Figure 2 is an enlarged side elevation of the cushion connection between the torque arm and chassis frame; Figure 3 is an end view looking in the direction of the arrows on line 3—3 of Figure 2; Figure 4 is a bottom plan view of the connection.

Referring to the drawing, the numeral 1 indicates one of the longitudinally extending chassis frame members which is supported through swinging links 2 and 3, upon opposite ends of the multiple leaf load supporting spring 4, the central portion of the spring being secured by U clamps 5 to the dead axle 6. It will be understood that the front axle 6 is provided at opposite ends in the conventional fashion, with swiveled wheel spindles which are connected through suitable steering linkage for unison swinging movement to guide the vehicle.

As shown in the drawing, one leg of an L shaped bracket 8 is interposed between the spring 4 and axle 6 and held in place by the U clamps 5, and to the other leg of the bracket there is secured, as by means of fastening bolts 9, the forward ends of legs 10—10 forming a part of a bifurcated torque arm or reach rod 11. At its rear end the reach rod 11 is provided with an eye for the insertion of a pivot stud or bolt 13 by which the torque arm is secured to the lower ends of a pair of swinging shackle links 14, connected at their upper ends by a shackle bolt 15 to a lateral dependent boss 16 that forms a part of a bracket 17, riveted or otherwise secured to the frame member 1.

Secured on opposite faces of the boss 16 by one or more bolts 19 are a pair of comparatively stiff spring packs or multiple leaf springs 20 and 21 that project downwardly on opposite sides of the shackle links 14 for contact with the lower portions of the links. These springs normally hold the shackle in centered position and transmit driving thrust through the torque arm between the frame and axle and yieldingly restrain and cushion any tendency toward swinging movement of the shackle links 14 due to the connection through the torque arm with the axle. The axle is, therefore, held under restraint of the springs 20 and 21 in a substantially centered relation between the shackles 2 and 3. However, the flexibility of the spring blades allows a limited to and fro movement of the axle under the influence of the violent vibratory forces incident to wheel wobble, cushioning the effects of the vibration and reducing the wheel wobble tendency.

The amount of movement to be given the axle need only be very slight and in order to limit the deflection of the cushioning springs and prevent strain thereon due to driving thrust when conditions are such that a great deal of resistance to the transmission of thrust is encountered, there is provided on the bracket 17 a pair of spaced dependent legs or projections 23 and 24 located beside the springs and provided with abutment faces at adjacent sides for contact with the free ends of the spring packs so as to limit deflection within a predetermined range.

It will be noted, particularly from Figs. 2 and 4, that the lower ends of the spring pack 21 and abutment 24 are slotted or bifurcated to accommodate the passage therethrough of the torque arm 11, but it will also be understood that the spring packs and abutment members may be made identical on opposite sides of the shackle, and the reach rod and shackle then connected with each other in any suitable fashion to clear the bracket parts.

The spring mounting thus described, with its associated torque arm may be used on both sides of the vehicle but under ordinary conditions it will be found that its use on the steering column side of the vehicle will be sufficient to eliminate wheel wobble conditions and prevent their effects on the steering mechanism.

I claim:

1. Means to eliminate steering wheel shimmy, including in combination with a frame, an axle carrying swivelled steering wheels, a load supporting spring between the axle and frame, a reach arm connected at one end with the axle, a swinging shackle pivotally connected at one end with the opposite end of said arm, and pivotally connected at its opposite end with a fixed part of the frame, leaf springs carried by the frame and projecting on opposite sides of the shackle for contact with the arm end thereof to offer yielding resistance to swinging movement of the shackle, and fixed abutments for the springs to limit their deflection within predetermined limits and thereafter rigidly resist movement of the shackle.

2. In a motor vehicle, an axle, a frame, a load supporting spring between the axle and frame and a shock absorbing connection including a swinging shackle, springs positioned on opposite sides of the shackle to yieldingly resist movement thereof, and stop devices to limit spring deflection within a predetermined range and rigidly resist shackle movement beyond said range.

3. Means to eliminate front wheel wobble, including in combination with a frame, a front axle, a load supporting spring connected with the axle and shackled at opposite ends to the frame, a link connected at one end with the axle and at its opposite end through a swinging shackle with the frame, a spring device associated with the last mentioned shackle to yieldingly resist swinging movement thereof, and abutment means engageable with said spring device to limit the extent of spring deflection within a given range.

4. Means to eliminate front wheel wobble, including in combination with a frame, a front axle, a load supporting spring connected with the axle and shackled at opposite ends to the frame, a link connected at one end with the axle and at its opposite end through a swinging shackle with the frame, spring means offering yielding resistance to shackle movement and stop means engageable with the spring means to definitely limit the action thereof and offer rigid resistance to shackle movement beyond said limit.

5. Means to eliminate front wheel wobble, including in combination with a frame, a front axle, a load supporting spring connected with the axle and shackled at opposite ends to the frame, a link connected at one end with the axle and at its opposite end through a swinging shackle with the frame, springs on opposite sides of the shackle offering resistance to movement in both directions and a stop for each spring to limit its extent of deflection and thereby offer rigid resistance to shackle movement.

6. In a motor vehicle, means to carry the gravity load of the frame on the wheel, a thrust transmitting connection between the axle and frame relieved of the gravity load by said carrying means and including a rigid reach rod, a spring element to yieldingly resist reach rod thrust and abutment means engageable with the spring element to limit its deflection within a predetermined range and rigidly resist reach rod thrust beyond said range.

7. Means to eliminate steering wheel wobble, including in combination, a frame, an axle carrying swivelled steering wheels, load transmitting means between the axle and frame allowing relative horizontal movement, and means independent of said load transmitting means between the axle and frame to transmit thrust longitudinally of the frame and allowing relative horizontal movement to an extent considerably less than said load transmitting means allows.

8. Means to eliminate steering wheel wobble, including in combination, a frame, an axle carrying swivelled steering wheels, load transmitting means between the axle and frame capable of accommodating relative horizontal movement of a considerable extent and resilient thrust transmitting means connecting the axle and frame independent of said load transmitting means for accommodating relative horizontal movement to a comparatively small extent and restricting axle movement to a small fractional portion of the range which the load transmitting means is capable of accommodating.

GEORGE E. A. HALLETT.